(12) United States Patent
Han

(10) Patent No.: US 8,107,091 B2
(45) Date of Patent: Jan. 31, 2012

(54) IMAGE FORMING APPARATUS AND IMAGE FORMING METHOD THEREOF

(75) Inventor: Young-soo Han, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1060 days.

(21) Appl. No.: 11/970,032

(22) Filed: Jan. 7, 2008

(65) Prior Publication Data

US 2008/0165374 A1 Jul. 10, 2008

(30) Foreign Application Priority Data

Jan. 8, 2007 (KR) ........................ 10-2007-0002042

(51) Int. Cl.
*G06F 15/00* (2006.01)
*G06F 3/00* (2006.01)
(52) U.S. Cl. ..................................... 358/1.11; 715/700
(58) Field of Classification Search ................. 358/1.11, 358/2.1, 1.13, 1.14, 447, 474, 525, 3.06, 358/1.6, 3.28, 1.9, 21; 382/298, 177, 305; 400/61, 76, 582, 621; 715/700, 296, 221, 230, 231
See application file for complete search history.

(56) References Cited

U.S. PATENT DOCUMENTS 6,753,862 B1 * 6/2004 Miyasaka et al. ............. 345/472

FOREIGN PATENT DOCUMENTS

JP 59-190863 10/1984

* cited by examiner

*Primary Examiner* — Saeid Ebrahimi Dehkordy
(74) *Attorney, Agent, or Firm* — Staas & Halsey LLP

(57) ABSTRACT

An image forming apparatus and an image forming method thereof store font information about a font of which a width of a dot line is less than a predetermined value; determine whether the width of the dot line of a text included in printing data is less than the predetermined value on the basis of the font information; and form an image by enlarging the width of the dot line that is less than the predetermined value among the dot lines of the text.

23 Claims, 5 Drawing Sheets

IMAGE FORMING APPARATUS AND IMAGE FORMING METHOD THEREOF

CROSS-REFERENCE TO RELATED APPLICATION

This application claims the benefit of Korean Patent Application No. 2007-2042, filed on Jan. 8, 2007 in the Korean Intellectual Property Office, the disclosure of which is incorporated herein by reference.

BACKGROUND OF THE INVENTION

1. Field of the Invention

Aspects of the present invention relate to an image forming apparatus and an image forming method thereof, and more particularly, to an image forming apparatus that can adjust a width of a dot line and an image forming method thereof.

2. Description of the Related Art

An image forming apparatus processes printing data and forms a printing image that can be output on a printing medium. In such case, the printing data has a dot pattern formed of pixels and is output with a predetermined width according to the dot pattern.

FIG. 1 shows a dot pattern of printing data. As shown in FIG. 1, the dot pattern has dot lines differing in width according to predetermined areas of the dot pattern. In this case, when the width of an output dot line is small, readability is decreased as the printing data cannot be accurately output. This problem may easily arise if a font has a dot line corresponding to the width of one dot.

Therefore, a conventional image forming apparatus performs a dot conversion process so as to increase the widths of all of the dot lines with respect to the printing data. However, since the dot conversion process is performed over all the area, even a dot line corresponding to a large width unnecessarily undergoes the dot conversion process thereby wasting toner.

SUMMARY OF THE INVENTION

Accordingly, it is an aspect of the present invention to provide an image forming method comprising: storing font information about a font of which a width of a dot line of the font is less than a predetermined value; determining whether the width of a dot line of a text included in a printing data is less than the predetermined value according to the font information; and forming an image by enlarging the width of the dot line of the text included in the printing data that is less than the predetermined value among the dot lines of the text.

According to an aspect of the present invention, the forming the image may comprise enlarging the width of the dot line of the text included in the printing data that is less than the predetermined value by referring to pixel data of the text if the text included in the printing data does not correspond to the stored font information. According to an aspect of the present invention, the image forming method may further comprise storing the font information about the text included in the printing data that does not correspond to the stored font information. According to an aspect of the present invention, the image forming method may further comprise storing the printing data of which the width of the dot line is enlarged. According to an aspect of the present invention, the image forming method may further comprise receiving the printing data, of which the width of the dot line is enlarged, from a host apparatus.

According to an aspect of the present invention, the image forming method may further comprise generating a user interface to receive an input to enlarge the width of the dot line. According to an aspect of the present invention, the determining whether the width of the dot line is less than the predetermined value may comprise determining whether the width of the dot line of the text is less than the predetermined value according to a rendering result of the printing data. According to an aspect of the present invention, the forming the image may comprise enlarging the width of the dot line to correspond to two dots if the width of the dot line of the text corresponds to one dot.

Another aspect of the present invention is to provide an image forming apparatus comprising: an image forming unit to form an image based on printing data; a storage unit to store font information about a font of which a width of a dot line is less than a predetermined value; and a controller to determine whether the width of the dot line of a text included in the printing data is less than the predetermined value according to the font information, and to form an image by enlarging the width of the dot line less than the predetermined value among the dot lines.

According to an aspect of the present invention, the controller may control the image forming unit to enlarge the width of a dot line of the text included in the printing data that is less than the predetermined value by referring to pixel data of the text if the text included in the printing data does not correspond to the stored font information. According to an aspect of the present invention, the controller may store font information about the text included in the printing data that does not correspond to the stored font information. According to an aspect of the present invention, the controller may control the storage unit to store printing data of which the width of the dot line is enlarged.

According to an aspect of the present invention, the controller receives the printing data, of which the width of the dot line is enlarged, from a host apparatus connected to the image forming apparatus. According to an aspect of the present invention, the image forming apparatus may further comprise a user interface generator to generate a user interface to receive an input to enlarge the width of the dot line. According to an aspect of the present invention, the controller may determine whether the width of the dot line of the text is less than the predetermined value according to a rendering result of the printing data. According to an aspect of the present invention, the controller may control the image forming unit to form the image by enlarging the width of the dot line to correspond to two dots if the width of the dot line of the text corresponds to one dot.

Additional aspects and/or advantages of the invention will be set forth in part in the description which follows and, in part, will be obvious from the description, or may be learned by practice of the invention.

BRIEF DESCRIPTION OF THE DRAWINGS

The above and/or other aspects of the present invention will become apparent and more readily appreciated from the following description of the embodiments, taken in conjunction with the accompanying drawings, in which.

DETAILED DESCRIPTION OF THE EMBODIMENTS

Figure 1:
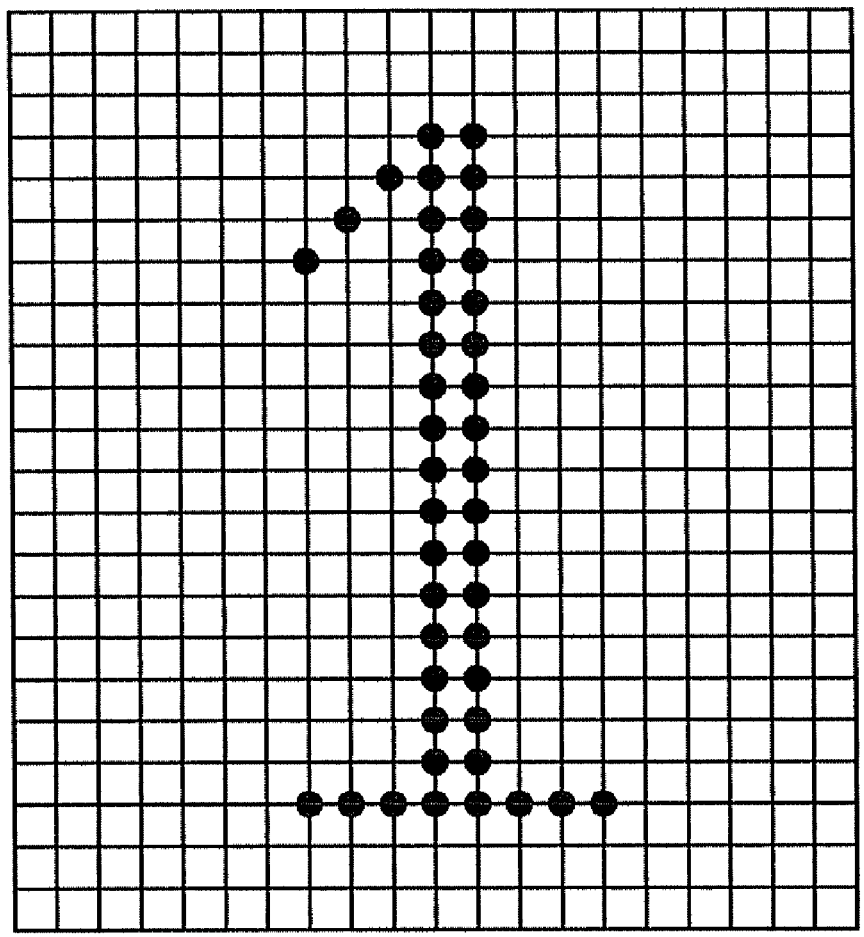
FIG. 1 shows a dot pattern of printing data.

Reference will now be made in detail to the embodiments of the present invention, examples of which are illustrated in the accompanying drawings, wherein like reference numerals refer to like elements throughout. The exemplary embodiments are described below so as to explain aspects of the present invention by referring to the figures.

Figure 2:
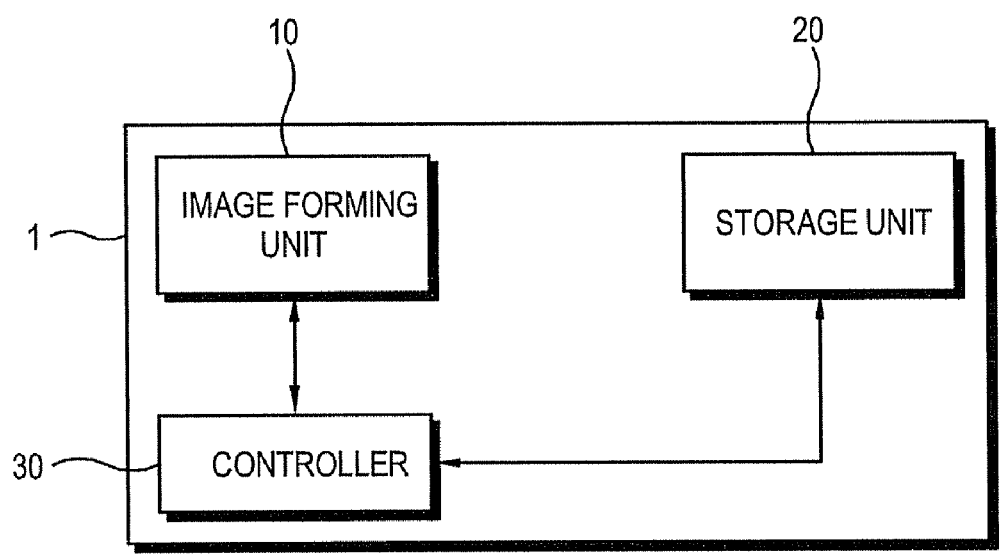
FIG. 2 is a block diagram of an image forming apparatus according to an exemplary embodiment of the present invention.

FIG. 2 is a block diagram of the image forming apparatus 1 according to an exemplary embodiment of the present invention. As shown in FIG. 2, the image forming apparatus 1 includes an image forming unit 10, a storage unit 20, and a controller 30, and the image forming apparatus 1 may be provided as a printing apparatus.

The image forming unit 10 forms a printing image of printing data. The image forming unit 10 includes at least a photosensitive body (not shown) in which an electrostatic latent image is formed, a developing unit (not shown) to develop a developer on the photosensitive body, and a transfer roller (not shown) to transfer the developer developed on the photosensitive body to form a desired image on the printing medium.

The storage unit 20 stores font information including a width of a dot line that is less than a predetermined value. Specifically, the storage unit 20 stores the information about a font, which includes a dot line that has a width less than the predetermined value, among fonts supported in the image forming apparatus 1. The storage unit 20 according to the exemplary embodiment of the present invention can be provided in various formats, such as a dynamic random access memory (DRAM), an electrically erasable and programmable read only memory (EEPROM), and flash memory. Also, the storage unit 20 may store font information about a font that does not include a dot line that has a width less than the predetermined value.

In addition, the storage unit 20 may further store printing data of which the width of the dot line is enlarged. Accordingly, if the printing data having an enlarged dot line is being stored in the storage unit 20 in correspondence to each character or a character string of a text, the image forming apparatus 1 may form an image by replacing received printing data with the printing data of which the width of the dot line is enlarged.

The controller 30 determines whether the width of a dot line of a text contained in the printing data is less than the predetermined value according to the font information stored in the storage unit 20, and the controller 30 controls the image forming unit 10 to form an image by enlarging the dot lines that have widths less than the predetermined value among the dot lines. The controller 30 according to this exemplary embodiment of the present invention may be provided as a microcomputer and/or software.

Further, the controller 30 may enlarge the width of a dot line that has a width less than a predetermined value according to pixel data of a text if the font information about the text contained in the printing data is not stored in the storage unit 20.

In detail, if the font information about the text contained in the printing data is not stored in the storage unit 20, the controller 30 determines whether there is an output dot among eight adjacent dot pixels around one dot pixel. Then, the controller 30 detects the width of a dot line according to which dot pixels include the output dots among the eight adjacent dot pixels. Here, each of the eight adjacent dot pixels may or may not include an output dot, and therefore output dots with respect to one dot pixel may have one of 256 (i.e., 2∧8) patterns. Accordingly, the width of the dot line is determined in accordance with the pattern of the output dot.

As a result, when it is detected that there is an area in which the width of the output dot is less than the predetermined value, the controller 30 controls the image forming unit 10 to form a printing image so that dot pixels adjacent to one reference dot pixel include output dots. In this case, the controller 30 can determine a location of the adjacent dot pixel according to detection directions for the width of the dot line.

That is, when the controller 30 detects the width in a row direction of the dot line disposed in a column direction, left and/or right adjacent dot pixels of the reference dot pixel may be set to include output dots so as to increase the width in the row direction of the dot line disposed in the column direction. And, when the controller 30 detects the width in the column direction of the dot line disposed in the row direction, up and/or down adjacent dot pixels of the reference dot pixel may be set to include the output dots so as to increase the width in the column direction of the dot line disposed in the row direction. Further, when the controller 30 detects the width of a dot line disposed in a diagonal direction, the controller 30 may set left and/or right and/or up and/or down adjacent dot pixels of the reference dot pixel so as to increase the width of the dot line disposed in a diagonal direction. Moreover, the controller 30 may increase the width of a dot line disposed in a row or column direction by setting diagonal adjacent dot pixels of the reference dot pixel to include the output dots so as to increase the width in the column or row direction, respectively.

Figure 3A:
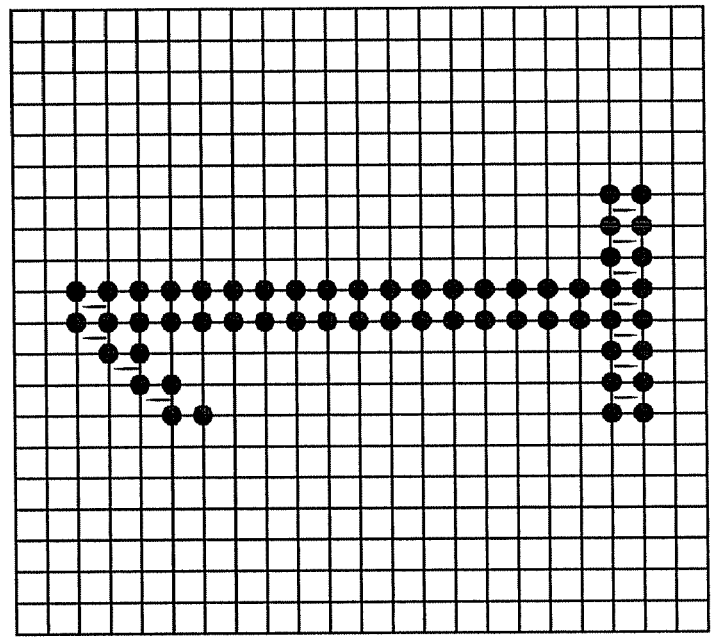
FIG. 3A and FIG. 3B show dot conversion of the image forming apparatus according to an exemplary embodiment of the present invention.
Figure 3A:
Figure 3A:
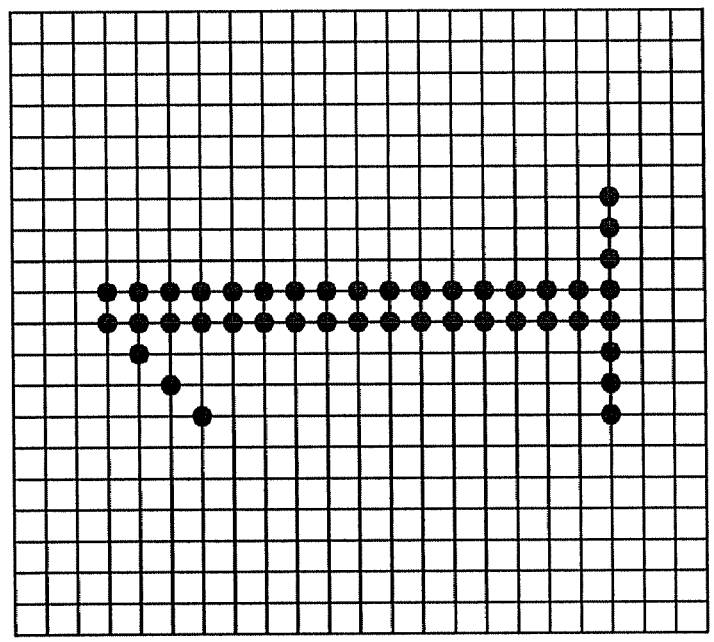
Figure 3B:
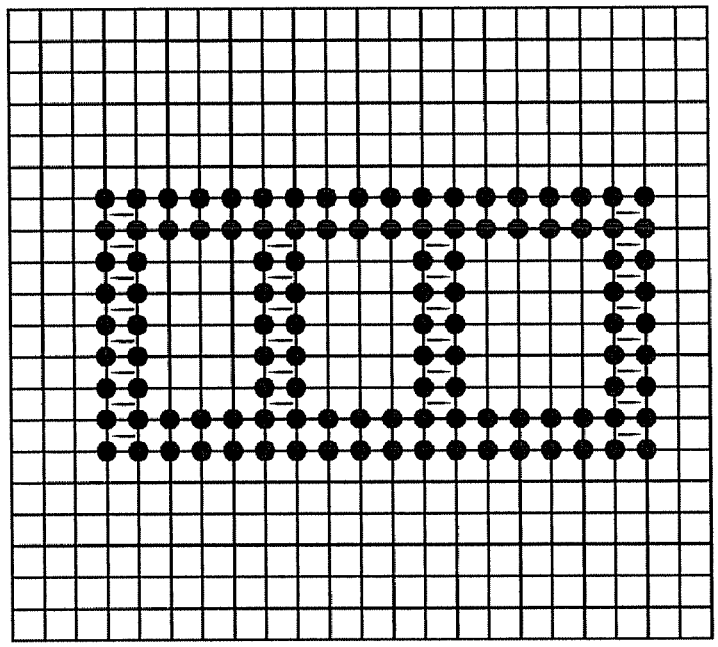
Figure 3B:
Figure 3B:
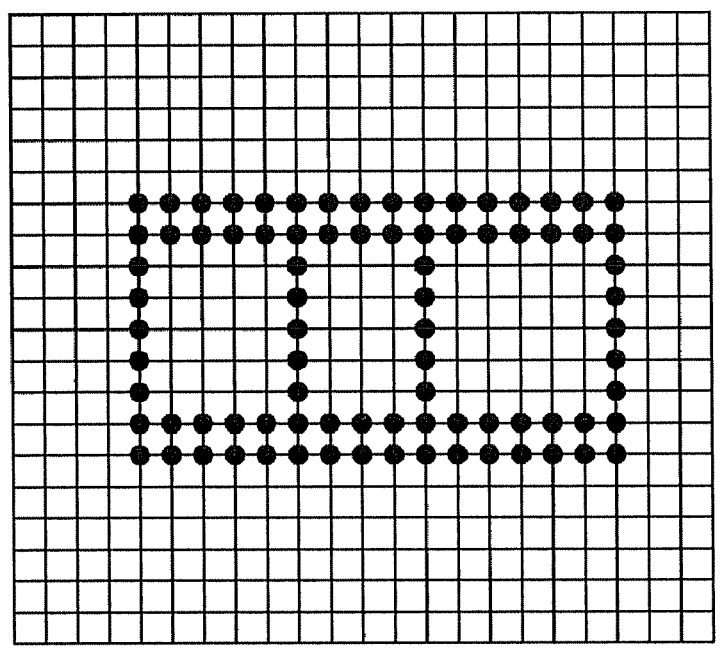

FIG. 3A and FIG. 3B show a dot conversion to enlarge the width of a dot line of a text contained in printing data in the image forming apparatus 1 according to an exemplary embodiment of the present invention. As shown in FIG. 3A and FIG. 3B, the controller 30 determines whether the width of a dot line of a text contained in printing data is less than the predetermined value. That is, the controller 30 determines whether adjacent (including up/down/right/left and diagonal) dot pixels adjacent to each dot pixel of the original printing data have output pixels, and the controller 30 determines whether the width of a dot line of the corresponding dot pixel is less than the predetermined value. Additionally, the controller 30 may also determine whether the width of a dot line of a text contained in the printing data is less than the predetermined value according to the font information stored in the storage unit 20.

It is illustrated in FIG. 3A and FIG. 3B that the controller 30 determines whether the width of each output dot line corresponds to one dot, but it is not limited thereto such that the predetermined value may be greater than a one dot width of the output dot line. Alternatively, the width of a dot line to be converted may vary for improving quality of a printing image.

Therefore, when the width of the dot line included in the text is less than the predetermined value, the controller 30 controls the image forming unit 10 to form an image by enlarging the width of the dot line having a width less than the predetermined value among the dot lines in the text. Here, although it is exemplarily illustrated in FIG. 3A and FIG. 3B that an upper portion of the character is upwardly extended and a lower portion of the character is downwardly extended, the controller 30 can extend the width of the dot line in one of up, down, right, and left directions or extend it in up and down directions or right and left directions. That is, the controller 30 enlarges the width of the dot line having a width less than the predetermined value among the dot lines of the text, thereby improving quality of a printing image to be output. In addition, the image forming apparatus 1 can prevent the waste of toner compared with the conventional image forming apparatus that wastes toner in conversion of the entire dots for increasing the width of the output dot.

Here, the controller 30 controls the storage unit 20 to store font information about the printing data of which the width of the dot line is enlarged. Accordingly, if received printing data contains a text based on the stored font information, the controller 30 enlarges the width of the dot line for the text. Further, the enlarged printing data as well as the font information may also be stored in the storage unit 20.

Meanwhile, the controller 30 determines whether the width of the dot line of the text is less than the predetermined value on the basis of the printing data, but the controller 30 is not limited thereto. Alternatively, the controller 30 may determine whether the width of the dot line of the text is less than the predetermined value according to a rendering result of the image forming unit 10. Further, the controller 30 may receive the printing data, of which the width of the dot line is enlarged, from a driver of a host apparatus.

According to another exemplary embodiment of the present invention, the image forming apparatus 1 may further include a user input unit, a user interface generator, and a display unit. In this exemplary embodiment, the controller 30 may receive an input to enlarge the width of the dot line of the text included in the printing data from the user input unit through a user interface generated in the user interface generator.

Figure 4:
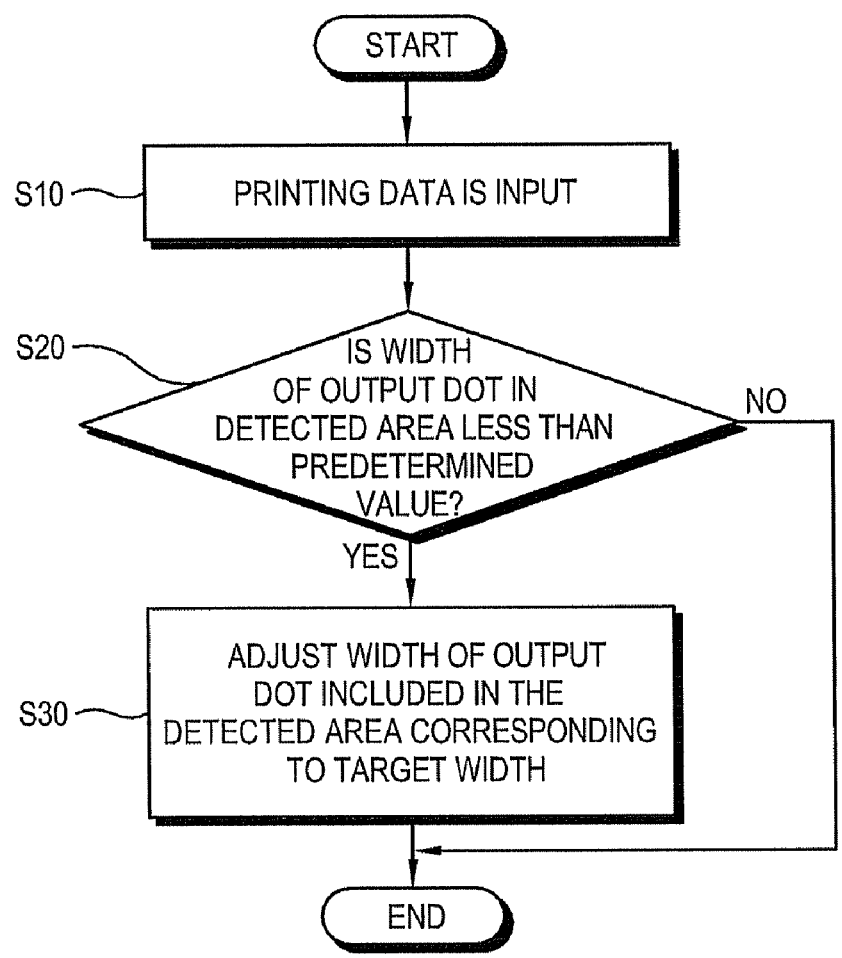
FIG. 4 is a flowchart of an image forming method according to an exemplary embodiment of the present invention.

An image forming method of the image forming apparatus 1 according to an exemplary embodiment of the present invention will be described in further detail with reference to FIG. 4. At operation S10, the controller 30 controls the storage unit 20 to store the font information about a font of which a width of a dot line therein is less than the predetermined value. At operation S20, the controller 30 determines whether the width of the dot line of the text included in the printing data is less than the predetermined value on the basis of the font information stored in the storage unit 20. At operation of S30, the controller 30 controls the image forming unit 10 to form an image by enlarging the width of the dot line having a width less than the predetermined value among the dot lines in the text. However, the method is not limited thereto such that the font information may not be available or the font information may not include information about a font of which a width of a dot line therein is less than the predetermined value (i.e., the widths of all of the dot lines contained therein are greater than the predetermined value). When the font information is not available or not previously stored in the storage unit 20, the controller 30 may analyze and enlarge the print data as described above and may or may not control the storage unit 20 to store the enlarged print data or the not-previously stored font information. Further, the controller 30 may receive the printing data from a driver of a host apparatus wherein the driver of the host apparatus has previously enlarged the width of the dot line.

Accordingly, quality of a printing image to be output can be improved and waste of toner can be prevented by adjusting the width of a dot line included only in a specific area of a text included in the printing data. As described above, in an image forming apparatus and an image forming method according to exemplary embodiments of the present invention, a width of an dot line having a width less than a predetermined value among the dot lines is enlarged, thereby improving quality of an output printing image.

Although a few exemplary embodiments of the present invention have been shown and described, it will be appreciated by those skilled in the art that changes may be made in these exemplary embodiments without departing from the principles and spirit of the invention, the scope of which is defined in the appended claims and their equivalents.

What is claimed is:

1. An image forming method, comprising:
storing font information about a font of which a width of a dot line of the font is less than a predetermined value;
determining whether a width of a dot line of a text included in a printing data is less than the predetermined value according to the font information; and
forming an image by enlarging the width of the dot line of the text included in the printing data that is less than the predetermined value among the dot lines of the text.

2. The image forming method of claim 1, wherein the forming the image comprises enlarging the width of the dot line of the text included in the printing data that is less than the predetermined value by referring to pixel data of the text if the text included in the printing data does not correspond to the stored font information.

3. The image forming method of claim 2, further comprising storing font information about the text included in the printing data that does not correspond to the stored font information.

4. The image forming method of claim 1, further comprising storing the printing data of which the width of the dot line is enlarged.

5. The image forming method of claim 1, further comprising receiving printing data, of which the width of the dot line is enlarged, from a host apparatus.

6. The image forming method of claim 1, further comprising generating a user interface to receive an input to enlarge the width of the dot line.

7. The image forming method of claim 1, wherein the determining whether the width of the dot line is less than the predetermined value comprises determining whether the width of
the dot line of the text is less than the predetermined value according to a rendering result of the printing data.

8. The image forming method of claim 1, wherein the forming the image comprises enlarging the width of the dot line to correspond to two dots if the width of the dot line of the text corresponds to one dot.

9. The image forming method of claim 1, wherein the enlarging the width of the dot line of the text included in the printing data that is less than the predetermined value comprises determining whether output dots are adjacent to a reference dot.

10. The image forming method of claim 9, wherein the enlarging the width of the dot line of the text included in the printing data that is less than the predetermined value further comprises determining a first direction of the dot line with reference to the reference dot.

11. The image forming method of claim 10, wherein the enlarging the width of the dot line of the text included in the printing data that is less than the predetermined value further comprises outputting an output dot adjacent to the reference dot in a second direction perpendicular to the first direction.

12. The image forming method of claim 11, wherein the second direction extends away from a central portion of the formed image.

13. The image forming method of claim 10, wherein the enlarging the width of the dot line of the text included in the printing data that is less than the predetermined value further comprises outputting an output dot adjacent to the reference dot in a second direction perpendicular to the first direction to increase the width of the dot line to at least the predetermined value.

14. The image forming method of claim 10, wherein the enlarging the width of the dot line of the text included in the printing data that is less than the predetermined value further comprises outputting an output dot in a second direction from the reference dot perpendicular to
the first direction.

15. The image forming method of claim 1, wherein the text comprises a character or a character string.

16. An image forming apparatus, comprising:
an image forming unit to form an image based on printing data;
a storage unit to store font information about a font of which a width of a dot line is less than a predetermined value; and
a controller to determine whether a width of a dot line of a text included in the printing data is less than the predetermined value according to the font information and to form an image by enlarging the width of the dot line less than the predetermined value among the dot lines.

17. The image forming apparatus of claim 16, wherein the controller controls the image forming unit to enlarge the width of the dot line of the text included in the printing data that is less than a predetermined value by referring to pixel data of the text if the text included in the printing data does not correspond to the stored font information.

18. The image forming apparatus of claim 17, wherein the controller stores font information about the text included in the printing data that does not correspond to the stored font information.

19. The image forming apparatus of claim 16, wherein the controller controls the storage unit to store the printing data of which the width of the dot line is enlarged.

20. The image forming apparatus of claim 16, wherein the controller receives the printing data, of which the width of the dot line is enlarged, from a host apparatus.

21. The image forming apparatus of claim 16, further comprising a user interface generator to generate a user interface to receive an input to enlarge the width of the dot line.

22. The image forming apparatus of claim 16, wherein the controller determines whether the width of the dot line of the text is less than the predetermined value according to a rendering result of the printing data.

23. The image forming apparatus of claim 16, wherein the controller controls the image forming unit to form the image by enlarging the width of the dot line to correspond to two dots if the width of the dot line of the text corresponds to one dot.

* * * * *